Aug. 18, 1953  G. T. CUMMING  2,649,393
METHOD OF MAKING VENETAIN BLIND SLATS
Filed Aug. 2, 1948  4 Sheets-Sheet 1

INVENTOR.
George T. Cumming
BY

ATTORNEY.

INVENTOR.
George T. Cumming
BY
ATTORNEY.

Aug. 18, 1953     G. T. CUMMING     2,649,393
METHOD OF MAKING VENETAIN BLIND SLATS
Filed Aug. 2, 1948     4 Sheets-Sheet 3

INVENTOR.
George T. Cumming
BY
ATTORNEY

Aug. 18, 1953  G. T. CUMMING  2,649,393
METHOD OF MAKING VENETAIN BLIND SLATS
Filed Aug. 2, 1948  4 Sheets-Sheet 4

INVENTOR.
George T. Cumming
BY
ATTORNEY.

Patented Aug. 18, 1953

2,649,393

UNITED STATES PATENT OFFICE 2,649,393

METHOD OF MAKING VENETIAN BLIND SLATS

George T. Cumming, Kansas City, Mo., assignor to William Volker and Company of Missouri, Inc., Kansas City, Mo., a corporation Application August 2, 1948, Serial No. 41,936

10 Claims. (Cl. 154—93)

This invention has to do with the manufacture of Venetian blinds and more particularly to the slats for said blinds, the most important object being to provide a method of making a particular type of Venetian blind slat constituting essentially a pair of spaced apart substantially parallel wires having an elongated flat tape affixed thereto.

The most important object of this invention is to provide the method of manufacturing Venetian blind slats including the steps of continuously feeding the tape along a predetermined path of travel while simultaneously feeding a pair of wires along one face of said tape and joining the wires and the tape as the same progress together.

Another important object of this invention is to provide a Venetion blind slat utilizing a tape made from material readily fusible upon itself to the end that in the method of manufacture, the tape may be readily secured to the reinforcing wires by the simple step of folding the tape over the wires and applying heat thereto to the end that the folded portions automatically fuse upon the remainder of the tape.

Another important object of this invention is the provision of a method of producing Venetian blind slats of the kind above set forth wherein is included the step of stretching the tape longitudinally and holding the same in a flat condition transversely as the tape and wires are being interconnected, all to the end that the tape itself will be flat and devoid of wrinkles in the finished slat.

A further object of this invention is the provision of a method of producing a particular type of Venetian blind slat wherein those portions of the tape that are folded over the reinforcing wires to present a hem or piping for the wires, are held down tightly against one face of the tape upon which such portions are used from the time such folding initially takes place and until the fusion is completed, all without interrupting the steady simultaneous progress of the wires and the tape along a predetermined path of travel.

The method forming the subject matter of this invention also includes the step of holding the two reinforcing wires in spaced apart relationship from the time the same are initially moved to a position resting upon one face of the tape and until such wires are permanently fixed to the tape.

Another important feature of the method of this invention includes the severance of the joined wires and tape into predetermined slat lengths after the tape stretching step has been completed and after the wires no longer need to be held in spaced apart relationship, said severing step including the compensation for steady movement of the tape and wires as the cutting means causes momentary retardation of slat movement.

A still further important object of this invention lies in the step of feeding the wires and the tape at different speeds to the end that the lengths of the wires and tape in the completed slat will be of uniform difference irrespective of the length of slat that is severed.

Many additional more minor objects of this invention will become clear as the following specification progresses and in carrying out the method, one embodiment of apparatus capable of carrying out the steps of the method is herein disclosed and will hereinafter be fully described. Such apparatus forms the subject matter of my copending application Serial No. 41,935, filed August 2, 1948, and entitled "Machine for Producing Venetian Blind Slats." This machine is illustrated in the accompanying drawing, wherein:

Fig. 10 is a fragmentary detailed cross sectional view taken on line X—X of Fig. 1a.

Figures 14, 15, 16, 17:
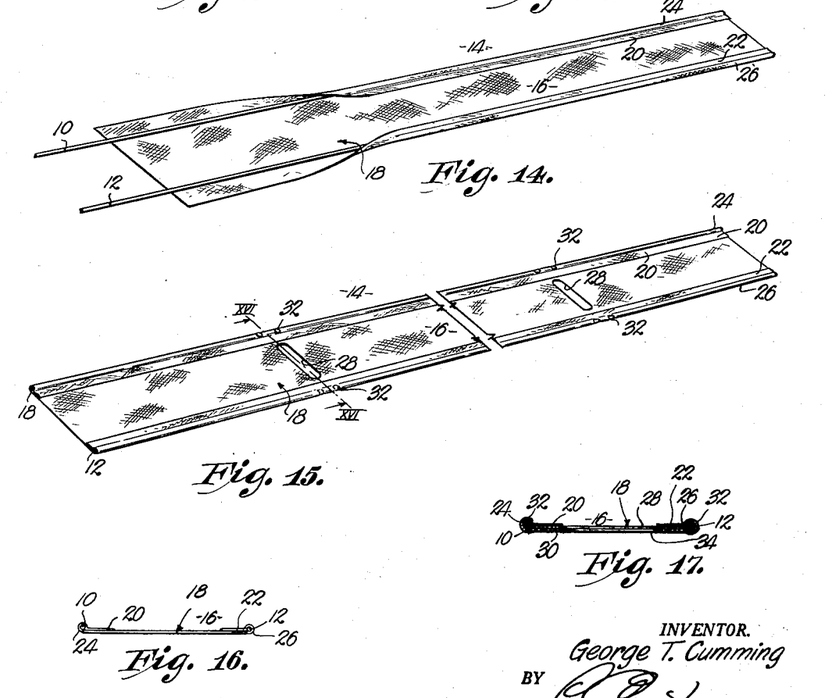
Fig. 14 is a perspective view of a Venetian blind slat to be produced by the machine forming the subject matter of this invention, the slat illustrated in Fig. 14 being only partially formed for clearness.
Fig. 15 is a perspective view of the Venetian blind slat completely formed.
Fig. 16 is an end view of the slat.
Fig. 17 is a transverse cross sectional view taken on line XVII—XVII of Fig. 15.

The Venetian blind slat contemplated to be manufactured by the method forming the subject matter of this invention differs from the common type of slat generally known in that the same is at least partially flexible and definitely not rigid as in the case of a wood or metallic panel. This slat is elongated in the usual manner as illustrated in Figs. 14 and 15 and includes a pair of substantially parallel, elongated reinforcing members 10 and 12 disposed along the longitudinal edges of the slat, the latter of which is generally designated by the numeral 14. These two wires 10 and 12 have secured thereto an elongated strip of tape 16.

This tape 16 is made from flexible material that is somewhat pliable and ductile and also slightly elastic within limits. Such material may constitute a fabric or a combined textile and paper product commonly used on ordinary window shades or any other material capable of use with a machine such as that about to be described in forming the Venetian blind slat 14 and by the method forming the subject matter of this invention.

Another characteristic of the material from which the tape 16 is formed is that it is readily fusible upon itself upon application of heat thereto, the fabric or other material used being, during manufacture thereof, treated with adhesive substances. As will hereinafter be more fully set forth, this characteristic is extremely advantageous since the longitudinal marginal edges of tape 16 are folded over the corresponding wires 10 and 12 to lie flatly against one face 18 of tape 16 and these folded edges 20 and 22 are held tightly upon face 18 while heat is applied thereto to the end that they adhere tightly to said face 18.

It is seen that a hem is formed in the tape 16 along the two longitudinal marginal edges thereof presenting pipings or tubular portions 24 and 26 for receiving the wires 10 and 12 respectively. The joined tape 16 and wires 10 and 12 are cut into desired lengths as illustrated in Fig. 15 by the machine about to be described and as hereinafter more fully set forth.

A pair of spaced apart elongated openings 28 are formed in the blind 14 and particularly in that portion thereof between the wires 10 and 12 and the marginal edges of the overlapped portions 20 and 22 thereof, said slots 28 having their longitudinal axes running transversely of slat 14. Each of these openings 28 is provided with a clip 30 disposed on the face of the blind 14 opposite to face 18 thereof and spanning the distance between the two reinforcing rods or wires 10 and 12 and the pipings 24 and 26. This clip 30 has its ends provided with ears 32 that partially circumscribe the pipings 24 and 26 and the wires 10 and 12 respectively encased therein. The ends of the clip 30 between the two ears 32 thereof overlap the portions 20 and 22 of the tape 16 and abut the innermost edges of the pipings 22 and 24, all as clearly illustrated in Fig. 17 of the drawings. It is thus seen that the ears 32 of clip 30 hold the wires 10 and 12 against separation and that the ends of the clip 30 prevent inward movement of the wires 10 and 12 toward each other.

It is contemplated that mounting of the clips 30 upon the slat 14 constitute the last operation and be accomplished by a specially formed mechanism capable of automatically stamping the openings 28 in the tape 16 and a registering opening 34 in each clip 30 of the same contour as openings 28. Thus the clip 30 also serves as a reinforcing means for the openings 28, the latter of which receive the Venetial blind elevating ropes in the usual manner.

Figure 1:
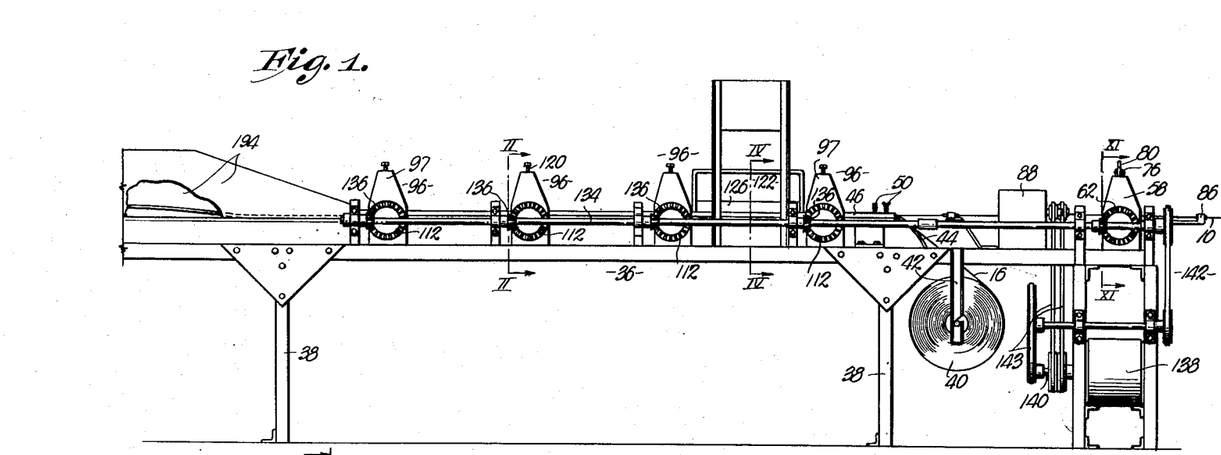
Fig. 1 is a side elevational view of a portion of a machine for producing Venetian blind slats following the method of the present invention.
Figure 1A:
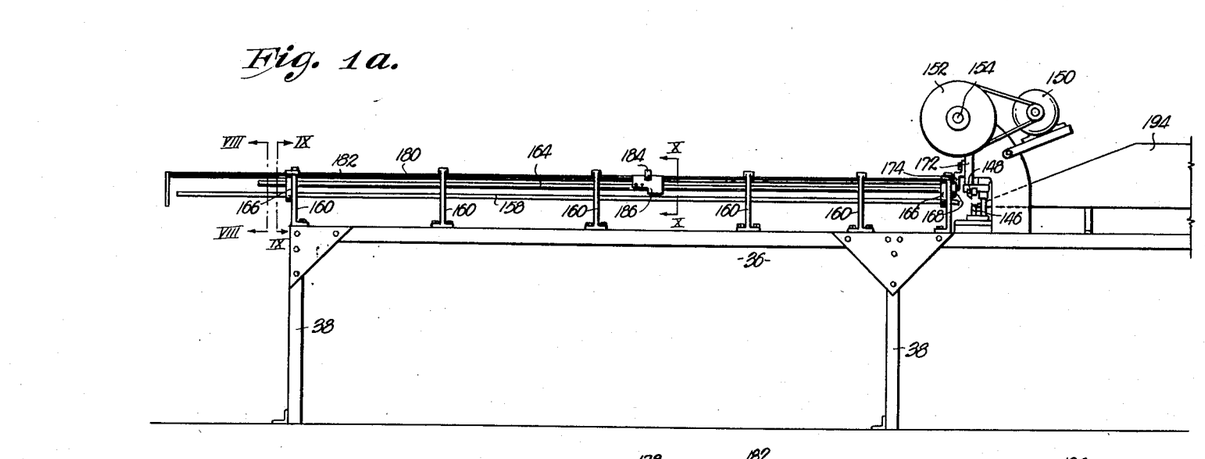
Fig. 1a is a side elevational view illustrating the remainder of said machine.

The machine capable of following the method of making the Venetian blind slat 14 just described illustrated in Figs. 1 and 1a of the drawing, includes a framework broadly designated by the numeral 36 having a plurality of supporting legs 38 disposed in spaced apart relationship throughout its length. As is readily seen in these two figures, the machine is generally elongated and the framework 36 supports all of the component parts thereof.

The flexible tape 16 is carried in a roll 40 adjacent one end of the machine and this roll 40 is rotatably supported by a bracket 42 depending from the framework 36. Tape 16 is fed from the roll 40 along the entire length of the framework 36 in a substantially rectilinear, horizontal path of travel, tape 16 passing first over an arcuate guide member 44. From this guide member 44 the tape 16 is directed over a supporting plate 46 which carries a pressure plate 48 beneath which tape 16 travels. This pressure plate 48 is of conventional character and is provided with a plurality of upstanding pins 50 serving as a means for shiftably securing plate 48 to plate 46, said pins 50 being provided with springs to yieldably hold tape 16 tightly, yet freely slidable upon the uppermost face of plate 46. From these plates 46 and 48 the tape 16 passes into a folding means therefor designated by the numeral 52 and hereinafter more fully described. Simultaneously with the feeding of the tape 16 from roll 40, the pair of spaced apart wires 10 and 12 are also fed upon the face 18 of tape 16. These wires 10 and 12 are directed into the machine from continuous rolls suitably supported by means not herein illustrated. These wires 10 and 12 first pass between pairs of spaced apart rollers 54 and 56 disposed, as illustrated in Fig. 11, adjacent one end of the machine proximal to the roll 40 of tape 16 and formed as more clearly illustrated in Fig. 11 of the drawing.

A hollow housing 58 mounted in upstanding relationship upon the framework 36 rotatably receives a shaft 60 having a bevel gear 62 on one end thereof externally of housing 58. One of the rollers 54 and one of the rollers 56 are mounted upon this shaft 60 and are rotatable therewith. These rollers are in spaced apart relationship as illustrated in Fig. 11.

Figure 12:
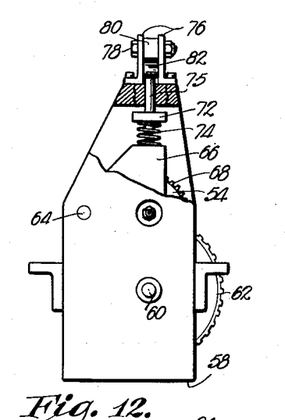
Fig. 12 is a side elevational view of the structure illustrated in Fig. 11 showing the side opposite to that illustrated in Fig. 1 of the drawing.

A pair of U-shaped brackets 66 disposed within the housing 58 have bearings adjacent the free ends of the legs thereof for receiving a shaft 64 that joins opposed side walls of housing 58 as seen in Fig. 12, said legs being substantially triangular-shaped as partially illustrated in Fig. 12 of the drawing. Each of these uppermost rollers 54 and 56 is provided with a stub shaft joining the legs of the respective bracket 66 and rotatably mounted in another set of bearings spaced from the bearings for the shaft 64.

Figure 11:
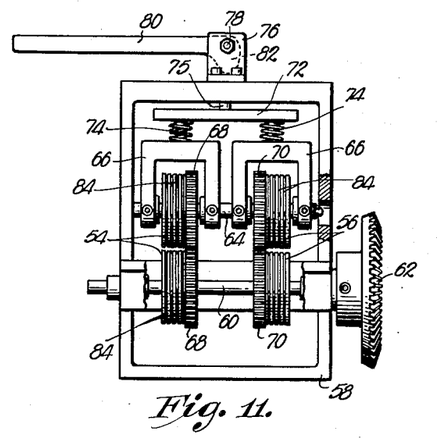
Fig. 11 is a fragmentary cross sectional view taken on line XI—XI of Fig. 1.

Gears 68 and 70 are formed on all the rollers 54 and 56 respectively adjacent one edge thereof, the gears of the uppermost rollers being enmeshed with the gears of the lowermost pair of rollers on shaft 60 as illustrated in Fig. 11 of the drawings and yieldably held in such meshing relationship by a pressure plate 72 overlying the two brackets 66, there being a pair of coil springs 74 interposed between the plate 72 and the uppermost face of the bights of bracket 66.

Pressure plate 72 has an upstanding pin 75 slidably mounted in the housing 58 and extending upwardly between a pair of brackets 76 mounted upon housing 58. These two brackets 76 have swingably secured thereto by pin 78 an elongated arm 80 having a cam portion 82 bearing against the uppermost end of the pin 75 and serving to release the uppermost rollers 54 and 56 when arm 80 is swung upwardly from the position illustrated in Figs. 11 and 12 of the drawing. All of the rollers 54 and 56 are provided with a plurality of annular grooves 84 disposed in substantially parallel relationship and extending outwardly from the gears 68 and 70 thereof. The grooves of the lowermost rollers register with the grooves of the uppermost rollers and progressively decrease in depth as the gears 68 and 70 of the rollers are approached.

The wires 10 and 12 of the slat 14 are directed between selected pairs of the grooves 84 after passing through a guiding means 86 extending outwardly from the frame 36 as illustrated in Fig. 1. Obviously, the combined diameter of any pair of grooves 84 is less than the diameter of the wires 10 and 12 to the end that a frictional grip is imparted to the wires 10 and 12 by the rollers 54 and 56 because of the provision of springs 74. Since these grooves 84 are of differing diameters, the speed at which the wires 10 and 12 are fed into the machine upon rotation of shaft 60 and consequently the rollers 54 and 56 will depend entirely upon which of the pairs of grooves receives the wires. The rollers 54 and 56 feed the wires 10 and 12 directly into a wire straightener 88 and since this straightener 88 may be of conventional character, the same has not been detailed and need not be described.

Figure 4:
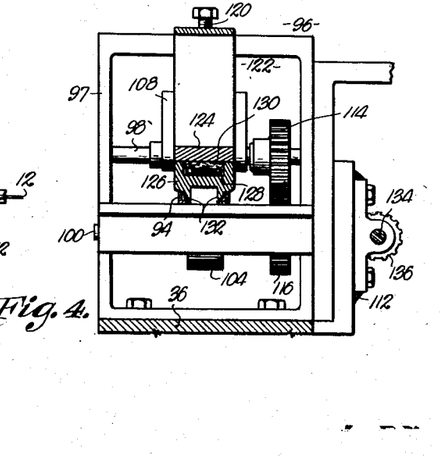
Fig. 4 is a fragmentary cross sectional view taken on line IV—IV of Fig. 1.
Figure 5:
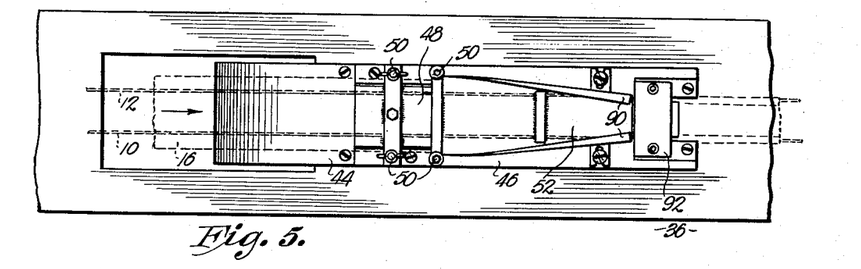
Fig. 5 is a fragmentary top plan view showing the means for folding the marginal edges of the tape forming a part of the slat over the reinforcing wires thereof.
Figure 6:
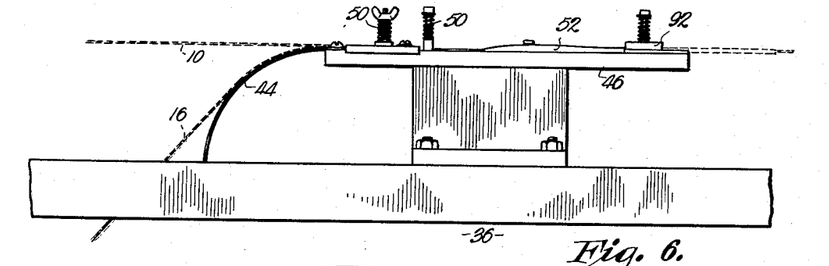
Fig. 6 is a fragmentary side elevational view showing the tape folding means illustrated in Fig. 5.

As illustrated in Figs. 5 and 6 of the drawings, the wires 10 and 12 are directed between the plates 46 and 48 directly upon the uppermost face of the tape 16 which is the face 18 thereof illustrated in Figs. 14 to 17 inclusive of the drawings. Fig. 5 also illustrates the manner in which the wires 10 and 12 are in substantially parallel relationship and spaced from the respective outermost marginal edges of the tape 16. The distance at which these wires 10 and 12 are so spaced determines the width of the slat 14 shown in Figs. 14 and 15. The folding means 52 which extends forwardly from the pressure plate 48 constitutes an initially flat strip of material formed from a bendable metallic substance, one end thereof being adjacent the pressure plate 48 and having a width substantially the same as the width of the tape 16. The longitudinal marginal edges of the opposite end of this folding means 52 are rebent upwardly and inwardly as at 90 to present spaced apart troughs for receiving and causing the marginal edges of the tape 16 to fold upon themselves over the wires 10 and 12. The distance between these troughs formed by the overlapping portions 90 of the member 52 adjacent the outermost free end thereof is substantially the same as the distance between the wires 10 and 12. It is thus seen as the wires 10 and 12 in the tape 16 progress together through the forming means 52, the portions 20 and 22 of tape 16 will form a pair of hems that completely encompass the two wires 10 and 12 forming the pipings 24 and 26. From the forming means 52, the wires 10 and 12 and the tape 16, pass beneath another pressure plate 92 yieldably bearing against the tape 16 and formed in much the same manner as the plate 48 and its component parts. The tape and wires progress from the pressure plate 92 into an elongated channel member 94 (Figs. 2, 3 and 4).

Figures 2, 3:
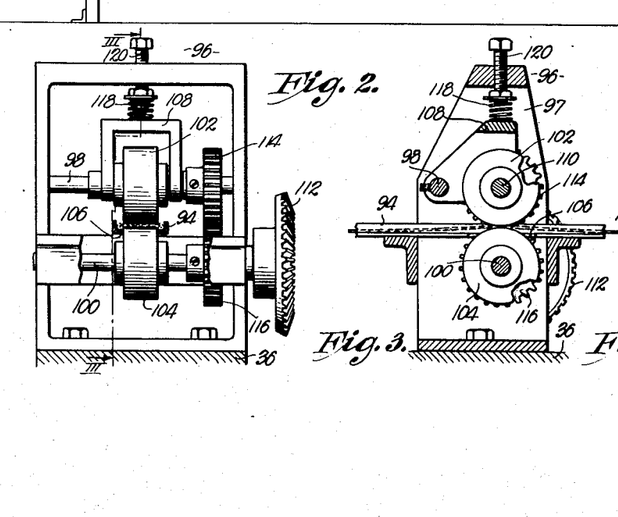
Fig. 2 is a transverse cross sectional view taken on line II—II of Fig. 1 looking in the direction of the arrows.
Fig. 3 is a cross sectional view taken on irregular line III—III of Fig. 2, parts being broken away for clearness.

This channel member 94 as illustrated in Fig. 2 of the drawings, constitutes a pair of L-shaped strips presenting upstanding side walls which are spaced apart a distance substantially the same as the width of the completed slat 14 shown in Fig. 15 of the drawing.

A plurality of roller assemblies (Figs. 2 and 3), are disposed throughout the length of the frame 36 for receiving the tape and the wires, after the former has been folded in the manner above described. These assemblies broadly designated by the numeral 96, include a polygonal framework 97 provided with a pair of spaced apart substantially parallel horizontal shafts 98 and 100, both of which are journaled for free rotation in the framework 97. These two shafts 98 and 100 traverse the path of travel of the tape 16 and its wires 10 and 12. The guide channel 94 is disposed between the shafts 98 and 100 and is provided with openings 106 for receiving a roller 104 that is secured to the shaft 100. In other words, the rollers 104 of all of the assemblies 96, extend upwardly through openings 106 of channel member 94.

The assemblies 96 are all provided with a U-shaped bracket 108 formed in much the same manner as the brackets 66 illustrated in Fig. 11 of the drawings in that the legs thereof are substantially triangular-shaped as shown in Fig. 3. Fig. 3 also illustrates the way in which the bracket 108 is secured directly to the shaft 98 and is swingable therewith.

Spaced from the shaft 98 and in substantially parallelism therewith is a horizontal stub shaft 110 spanning the distance between the legs of the bracket 108 and journaled in suitable bearings. This stub shaft 110 has a roller 102 secured thereto, said roller 102 being disposed between the legs of the bracket 108 and in opposed relationship directly above the roller 104 of shaft 100. One end of the shaft 100 extends outwardly beyond the framework 97 and has a bevel gear 112 mounted thereon. A pair of gears 114 and 116 on shafts 110 and 100 respectively, are in meshing relationship and held in this position by a coil spring 118 disposed between the uppermost face of the bracket 108 and a bolt 120 threadably mounted in the uppermost wall of framework 97.

It is clear that the tension of spring 118 may be adjusted by manipulation of the bolt 120 determining also the extent of the frictional pressure which the roller 102 imparts to the tape 16 and the overlapping portions 20 and 22 thereof.

In other words, this tape 16 passes between the rollers 102 and 104 which are driven at the same rate of speed by virtue of the bevel gear 112 and the two intermeshing gears 114 and 116. The rollers 102 and 104 are of substantially the same diameter but these rollers of the assemblies 96 progressively increase in diameter as the fed end of the tape is approached. In other words, the rollers 102 and 104 of the assemblies 96 first receiving the tape 16 are of a given diameter sufficient to impart a frictional grip to the tape 16 and to move the same along the framework 36 within the channel 94. As the tape 16 reaches the second assembly 96, the rollers 102 and 104 thereof having a slightly greater diameter, a greater pressure or gripping force will be imparted to the tape 16 and an increased pull exerted thereon. This same increase in pull and driving force for the tape 16 is present in the third and fourth assemblies 96 but progressively increasing in value. It is thus seen that all of the assemblies 96 cooperate in driving the tape 16 along its horizontal path of travel, but because of this difference in the diameters of the rollers 102 and 104 of the respective assemblies 96, a longitudinal stretching force is imparted to the tape 16 itself. This stretching force is present throughout the entire length of the tape 16 between the first assembly 96 and the last assembly 96 along the framework 36.

It is to be understood further that additional adjustment of this pulling and stretching force upon the tape 16 can be made by manipulation of the bolts 120.

Interposed between the first and the second assemblies 96 is heating structure (Fig. 4), broadly designated by the numeral 122. This heating structure 122 includes an uppermost plate 124 preferably of asbestos or other insulating material and a body 126 provided with a cavity 128 within which is provided an electric heating element 130. This body 126 is made from any good heat conductor and has a pair of down-turned ribs 132 extending therefrom, said ribs 132 being spaced apart a distance substantially the same as the distance between the overlying portions 20 and 22 of the tape 16. The lowermost edges of these ribs 132 are spaced slightly above the channel member 94 and as the tape progresses through the structure 122, heat emanating from element 130 will cause the portions 20 and 22 of tape 16 to fuse upon the face 18 thereof.

As above mentioned, the first assemblies 96 serve to hold the portions 20 and 22 tightly against the face 18 of the tape 16 prior to passage thereof into the structure 122 and as the tape progresses outwardly from the heating structure 122, the next assembly 96 will hold the portions 20 and 22 tightly in place until the tape 16 cools and the portions 20 and 22 rendered capable of adhesion without support.

As illustrated in Fig. 2 of the drawing, the width of the rollers 102 and 104 is substantially the same as the distance between the wires 10 and 12, thus serving as a means for holding the wires 10 and 12 in substantially parallel spaced apart relationship. By the time the wires 10 and 12 and the tape 16 secured thereto, reaches and passes beyond the last assembly 96 where stretching is no longer applied to the tape 16, the overlapping portions 20 and 22 will be tightly secured in place with the wires 10 and 12 within the pipings 24 and 26. The bevel gear 62 is disposed in alignment with all of the bevel gears 112 of assemblies 96 and are actuated by a common drive constituting an elongated shaft 134 extending substantially the entire length of the frame 36 and in a horizontal position. The shaft 134 has a small bevel gear 136 for each of the bevel gears 112 and for the bevel gear 62 respectively.

Any suitable means such as an electric motor or the like 138 may be used to drive the shaft 134. This motor 138 is mounted directly upon the framework 36 and has its drive shaft 140 joined to the shaft 134 by means of a plurality of shafts, pulleys and belts or the like broadly designated by the numeral 142 and interconnected in the conventional manner. Belts 143 join pulleys mounted upon shaft 140 of motor 138 and corresponding pulleys forming a part of the wire straightener 88 and serve to drive the latter in the usual manner. The joined tape and wires are fed into a cutting means (Fig. 7) broadly designated by the numeral 144 including a stationary cutting blade 146 and a vertically reciprocable cutting blade 148. This reciprocable blade 148 is driven by an electric motor or the like 150 (Fig. 1a) that drives a relatively large pulley 152. Conventional interconnection between pulley 152, the shaft 154, upon which it is mounted, and the movable cutter 148, causes reciprocation of the latter. It is contemplated that an over-drive assembly form a part of the cutting means 144. Since this means for imparting vertical reciprocation with great force to the blade 148 is of conventional character and forms no part of the subject matter of this invention, the same is not illustrated in detail and need not be described.

From the channeled track 94, the joined tape 16 and wires 10 and 12 project between the normally spaced apart cutters 146 and 148 into a track 156 extending outwardly beyond the cutting means 144 and mounted upon the framework 36. This track 156 constitutes a pair of spaced apart members 158, each of which is L-shaped in cross section as shown in Fig. 3. A number of lugs 153 removably secured to one of the members 158 has an L-shaped plate 155 joined thereto, which plate 155 has one leg thereof spanning the distance between the members 158 in overlying relationship thereto.

A plurality of upstanding U-shaped brackets 160 mounted upon the framework 36 in spaced apart relationship, have elongated rods 162 and 164 journaled in the legs thereof. These rods 162 and 164 are spaced apart and disposed above the track 156. The rods 162 and 164 support a number of opposed dogs 166 and it is upon these dogs 166 that the members 158 of track 156 are mounted. Dogs 166 are normally in the position illustrated in Figs. 9 and 13 where the members 158 are in a position for receiving the tape 16 and its wires 10 and 12 and as rods 162 and 164 are caused to rotate in one direction, the dogs 166 will move apart, thereby moving the members 158 apart and permitting dropping or feeding of the cut slat 14 from plates 155.

Means for causing rotation of the rods 162 and 164 constitutes opposed links 168 secured directly to the rods 162 and 164 and extending inwardly toward each other in overlying relationship to the track 156. The innermost free ends of these links 168 are provided with rollers 170.

Figures 7, 13:
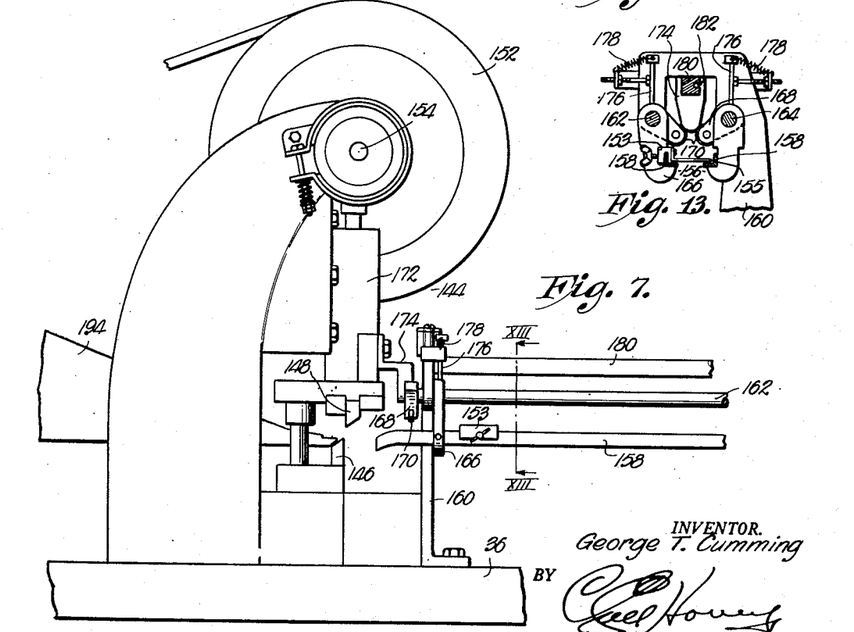
Fig. 7 is a fragmentary side elevational view illustrating the tape cutting means per se.
Fig. 13 is a detailed cross sectional view taken on line XIII—XIII of Fig. 7 looking in the direction of the arrows.
Figures 8, 9:
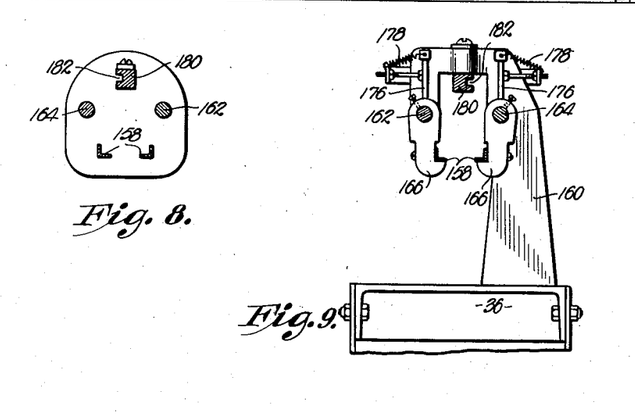
Fig. 8 is a detailed cross sectional view taken on line VIII—VIII of Fig. 1a, looking in the direction of the arrows.
Fig. 9 is a fragmentary cross sectional view taken on line IX—IX of Fig. 1a looking in the direction of the arrows.

A vertically reciprocable member 172 forming a part of the cutting means 144 has a cam member 174 secured directly thereto as shown in Fig. 7, this cam member 174 depending downwardly between the links 168 and bearing against the opposed rollers 170. It is clear that as the member 172 moves downwardly to shift cutter 148 to a point where it cooperates with the rigid cutter 146 in severing the tape 16 and wires 10 and 12, cam 174 will also move downwardly between the rollers 170, spreading the same apart causing rotation of the rods 162 and 164 and thereby spreading the dogs 166 to release the cut slat 14. Upstanding pins 176 on rods 162 and 164 have their uppermost ends joined to the respective bracket 160 by means of a spring 178 for yieldably holding the dogs 166 in the position illustrated in Fig. 13. The cut slats 14 will fall directly upon the uppermost of framework 36 or, if desired, a receiving tray therefor (not shown) may be provided.

Figure 10:
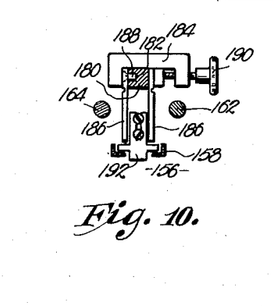

The bights of the brackets 160 are joined by an elongated bar 180 provided with a longitudinal slot 182. A U-shaped bracket 184 overlies this bar 180 and overlaps the sides thereof, this bracket 184 being provided with a pair of arms 186 depending therefrom on each side of the bar 180 (see Fig. 10).

A pin 188 mounted upon one of the arms 186 extends into the slot 182 of bar 180. Manually operable clamping means 190 serves to shiftably secure the bracket 184 and its component parts directly to the bar 180. As noted in Fig. 10 of the drawing, arms 186 extend downwardly between the rods 162 and 164 and have secured thereto a plate 192 that projects downwardly between the L-shaped members 158. This plate 192 is connected electrically in a conventional manner to the motor 150 and since plate 192 is directly within the path of travel of the tape 16 and the wires 10 and 12, as soon as contacted a circuit is closed through the motor 150 to operate the cutting means 144 as well as the cam member 174 for releasing the cut slat 14. Since the bracket 184 is shiftably mounted upon the elongated bar 180, the length of the slat 14 may be selected. Also, this bracket 184 is removably mounted upon bar 180 to the end that the same may be moved to a point between any two of the brackets 160. Inasmuch as the wires 10 and 12 and tape 16 are continuously and simultaneously fed through the machine by common driving means, each time the blades 146 and 148 of cutting means 144 come into operation, the movement of the tape 16 and wires 10 and 12 would ordinarily be momentarily stopped. Accordingly, compensation is made for "buckling" of the tape and wires during each cutting operation. This "buckling" effect amounts to an upward bending of the tape and wires in the manner illustrated in Fig. 1 of the drawings, said "buckling" taking place between the last of the assemblies 96 and the cutting means 144. At this point of upward flexing or bending of the tape and wires momentarily during each cutting operation is disposed a pair of spaced apart upstanding walls 194 to guide the tape and wires as the same moves upwardly.

While the operation of the machine has been fully described throughout the above description of the component parts thereof, a brief summary of the operation of the machine is as follows:

The wires 10 and 12 are fed continuously through the rollers 54 and 56 while the tape 16 is at the same time fed from roll 40 through the means 52 and thence between the plurality of pairs of rollers 102 and 104. Stretching action takes place in the tape 16 along the assemblies 96 and such stretching is released when the tape and wires reach the last of the assemblies 96.

It is desired that the ends of the wires 10 and 12 of the slat 14 be disposed a slight distance inwardly from the end of the tape 16 and consequently, such adjustment can be made by selecting the grooves 84 into rollers 54 and 56 in which the wires 10 and 12 are disposed. These grooves 84 therefore, compensate for differing lengths of slats 14. In other words, as the switch plate 192 is shifted whereby slats 14 of different lengths are cut, the distance at which tape 16 projects beyond the ends of the wires 10 and 12 will accordingly vary because of the common drive for the tape and the wires.

It is a simple expedient to actuate the lever 80 and to change the wires 10 and 12 moving the same into grooves 84 of different diameters. After the strips are cut into predetermined lengths, they may subsequently be placed into another machine (not shown) for mounting the clips 30 and forming the openings 28 and 34 as above described.

While all of the steps of the method of making Venetian blind slats have become apparent through the above description of apparatus capable of carrying forth such method, the steps can be briefly outlined in the following manner:

Obviously, the first step of the method constitutes directing the tape and the wires simultaneously through a given path of travel with the wires disposed upon one face of the tape in spaced apart relationship to the longitudinal marginal edges of the tape and with the wires substantially parallel. It is advantageous to utilize a common driving means for the tape and wires as accomplished through the apparatus herein described and, therefore, another step in the method lies in controlling the speed of travel of the wires with respect to the speed of travel of the tape. With such control, the resultant slat will have its wires spaced slightly inwardly from the ends of the tape irrespective of the length of the particular slat that is severed.

The next step in the method is to fold the marginal edges of the tape over the two spaced apart wires to present pipings for the wires and also to form portions of the tape which are to be subsequently joined to said one face of the tape. After the folding and hem forming operation has taken place, the heating process comes into action to cause fusing of the overlapping portions of the tape to the proximal face thereof.

It is understood that the method includes the step of holding the hem forming portions of the tape tightly against one face thereof not only before the same pass in the heating structure but after the joint tape and wires move to a point where cooling is possible.

These operations or steps, together with all of the other following steps are carried out while the tape and wires progress without any interruption whatsoever.

Another step in the method lies in the longitudinal stretching of the tape together with holding the tape in a flat condition transversely and holding the wires spaced apart substantially parallel throughout the path of travel of the elements from the folding step to the slat severing step.

The method also includes the step of releasing the joined tape and wires from the stretching means prior to severance and then the final step of cutting the same into slats of predetermined lengths and delivering such slats from the machine. It is, of course, understood that the tape is formed from material that is readily fusible upon itself upon application of heat thereto and it is through the use of such material that the method forming the subject matter of this invention, is made possible. A specially formed and highly desirable slat is produced quickly and efficiently if these steps are followed and obviously, the said steps are all interconnected due to the fact that the precise speed of travel of the tape and wires, the stretching action, the heat applying means and the holding and feeding structure for the tape and wires both before and after joinder thereof, must operate simultaneously and in conjunction one with the other before a slat can be produced as easily and quickly as is possible through this method.

It is appreciated that many other methods might well be used to produce the slat but the advantages hereof are apparent and it will be appreciated a tremendously large number of slats can be produced in a short length of time if the steps are followed as herein outlined and in the sequence set forth. Accordingly, it is to be understood that such changes and modifications of the steps of the method forming the subject matter of this invention as fairly come within the scope of the appended claims, are contemplated hereby.

Having thus described the invention what I claim as new and desire to secure by Letters Patent is:

1. The method of producing Venetian blind slats which comprises continuously feeding a flat flexible tape along a predetermined path of travel; simultaneously feeding a pair of wires along one face of the tape; folding portions of the tape over the wires; and joining said portions of the tape to said one face thereof as the wires and the tape progress together.

2. The method of producing Venetian blind slats which comprises continuously feeding a flat flexible tape along a predetermined path of travel; simultaneously feeding a pair of wires along one face of the tape; maintaining said tape only in a stretched condition longitudinally as the same is fed; and joining the wires and the tape while the tape is stretched.

3. The method of producing Venetian blind slats which comprises continuously feeding a flat flexible tape along a predetermined path of travel; simultaneously feeding a pair of wires along one face of the tape at a speed differing from the speed of travel of the tape; maintaining said tape stretched longitudinally as the same is fed; and joining the wires and the tape while the tape is stretched.

4. The method of producing Venetian blind slats which comprises continuously feeding a flat flexible tape along a predetermined path of travel; simultaneously feeding a pair of wires along one face of the tape; folding portions of the tape over the wires; adhesively joining said portions of the tape to said one face thereof as the wires and the tape progress together; and holding said portions of the tape tightly against said one face thereof while adhesively joining the same.

5. In the method of producing Venetian blind slats which includes continuously pulling a flat, flexible tape along a predetermined path of travel; progressively increasing the pulling force on the tape as the fed end thereof is approached whereby to maintain said tape stretched longitudinally; simultaneously feeding reinforcing means along one face of the tape; and joining said means and the tape as the latter is being stretched and as the tape and the means progress together.

6. The method of producing Venetian blind slats which comprises continuously feeding a flat, flexible tape along a predetermined path of travel, said tape being formed from material capable of fusing upon itself upon application of heat thereto; simultaneously feeding a pair of wires along one face of the tape; folding portions of the tape over the wires; applying heat to the tape for fusing said portions of the tape to said one face thereof; and pressing said portions of the tape tightly against said one face thereof while heating the same and while feeding the tape and the wires.

7. The method of producing Venetian blind slats which comprises continuously feeding a flat, flexible tape along a predetermined path of travel, said tape being formed from material capable of fusing upon itself upon application of heat thereto; simultaneously feeding a pair of wires along one face of the tape; folding portions of the tape over the wires; applying heat to the tape for fusing said portions of the tape to said one face thereof; and holding said portions of the tape tightly against said one face thereof before and after application of said heat thereto.

8. The method of producing Venetian blind slats which comprises continuously feeding a flat, flexible tape along a predetermined path of travel, said tape being formed from material capable of fusing upon itself upon application of heat thereto; simultaneously feeding a pair of wires along one face of the tape; holding said wires spaced apart and spaced from proximal marginal edges respectively of said tape; folding said marginal edges of the tape over corresponding wires; applying heat to the tape for fusing said marginal edges to said one face of the tape; and applying pressure to said tape portions and to the opposite face of said tape during fusing for holding the tape in tight engagement with the wires.

9. The method of producing Venetian blind slats which comprises guiding a flexible tape along a rectilinear path of travel; stretching said tape longitudinally along a portion of its length; feeding a pair of wires in spaced relationship along one face of the tape at substantially the same rate of speed as the speed of travel of the tape; joining the wires and the tape along the stretched length of the latter; releasing a portion of the tape joined to the wires from said stretching action; and severing a part of said portion of the tape and of the wires joined thereto into predetermined slat lengths.

10. The method of producing Venetian blind slats which comprises guiding a flexible tape along a rectilinear path of travel; stretching said tape longitudinally along a portion of its length; feeding a pair of wires in spaced relationship along one face of the tape at substantially the same rate of speed as the speed of travel of the tape; joining the wires and the tape along the stretched length of the latter; releasing a portion of the tape joined to the wires from said stretching action; supporting said portion of the tape and the wires joined thereto in a severing position; severing a part of said portion of the tape and of the wires joined thereto into predetermined slat lengths; and releasing the slat from said supported position.

GEORGE T. CUMMING.

(References on following page)

References Cited in the file of this patent

UNITED STATES PATENTS

| Number | Name | Date |
|---|---|---|
| 505,379 | Barrett | Sept. 19, 1893 |
| 505,380 | Barrett | Sept. 19, 1893 |
| 1,358,283 | Brown | Nov. 9, 1920 |
| 1,872,316 | Meeker | Aug. 16, 1932 |
| 2,091,579 | Balthasar | Aug. 31, 1937 |
| 2,228,910 | Houghton | Jan. 14, 1941 |
| 2,304,534 | Burns | Dec. 8, 1942 |
| 2,309,093 | Borden | Jan. 26, 1943 |
| 2,368,911 | Andler | Feb. 6, 1945 |
| 2,384,462 | Goodman | Sept. 11, 1945 |
| 2,451,728 | Gardner et al. | Oct. 19, 1948 |
| 2,488,453 | Vogel | Nov. 15, 1949 |

FOREIGN PATENTS

| Number | Country | Date |
|---|---|---|
| 497,788 | Great Britain | Dec. 28, 1938 |